Feb. 17, 1959 W. T. BEDENK 2,874,052
CHOCOLATE-CONTAINING CULINARY MIXES
Filed June 8, 1956

Inventor
William T. Bedenk
By Watson, Cole, Grindle & Watson
Attorneys

United States Patent Office 2,874,052
Patented Feb. 17, 1959

2,874,052

CHOCOLATE-CONTAINING CULINARY MIXES

William T. Bedenk, Greenhills, Ohio, assignor to The Procter & Gamble Company, Cincinnati, Ohio, a corporation of Ohio Application June 8, 1956, Serial No. 590,324

8 Claims. (Cl. 99—94)

This invention relates to methods for preparing culinary mixes. More particularly, it relates to mixes comprising sugar, flour, shortening and cocoa, and which are suitable for use in preparing baked goods.

The use of so-called "prepared mixes" for baked goods has achieved wide usage, particularly in home baking. In mixes of this type, the ingredients are blended together in proper proportions to form a dry mixture, and are then packaged. To prepare the batters which are to be baked, liquid materials such as water, milk, and/or eggs, are added to these mixes. By utilization of such mixes, one of the major problems in baking, variation in ingredients, has been eliminated to a large degree.

In the co-pending patent application of Mills, U. S. Serial No. 521,416, there is disclosed a method of preparing culinary mixes which comprises thoroughly mixing together flour, sugar and shortening, and then subjecting this mixture to simultaneous shearing and crushing forces. As was further disclosed in the application, a much shorter agitation time can be used to prepare a baking batter from such mixes than is required by prior art mixes without adversely affecting the resulting baked products.

In the preparation of chocolate cake mixes by such a process, it has been found that if the cocoa is combined with the other ingredients of the mix prior to the shearing and crushing step, cakes prepared from such a mix tend to have pale, brittle and cracked crusts. It has now been found that if the cocoa is added to the mix subsequent to the shearing and crushing step, baked products produced from such a mix will have crusts which are not brittle and cracked, but instead are soft and uniform.

Accordingly, it is one of the objects of this invention to provide chocolate cake mixes which can be used to prepare cakes having soft and uniform crusts and to provide methods of making such mixes.

Other objects and advantageous features will be apparent from the following detailed description and from the drawings in which Figure 1 shows the top crust of a chocolate cake prepared from a mix in which cocoa was added to the mix prior to subjecting the mix to simultaneous shearing and crushing forces, Figure 2 shows a cross-section of the cake shown in Figure 1, Figure 3 shows the top view of a chocolate cake prepared from a mix in which cocoa was added to the mix after it had been subjected to simultaneous shearing and crushing forces, and Figure 4 is a cross-section of the cake shown in Figure 3.

In defining this invention, the term "cocoa" has been used for describing the ingredient which produces the chocolate flavor in the cakes. To prepare cocoa, cacao beans are fermented and then roasted, shelled and cracked. The cracked beans are ground at an elevated temperature. As a result of the temperature and pressure during the grinding, a fluid product is formed, namely, chocolate liquor. This chocolate liquor, containing over 50% cocoa butter, is run into molds and cooled to a solid form to form chocolate. Cocoa can be made by placing the chocolate liquor in a hydraulic press and pressing out a part of the cocoa butter. The cake which remains is then pulverized, and this pulverized product is cocoa. Cocoa suitable for use in the process of this invention may contain from 1% to 30% fatty constituents.

Chocolate may be used in practicing the process of this invention and it is intended, therefore, that chocolate, as described above, is to be encompassed by the term "cocoa." When chocolate is used, it should be in a finely divided form. It is preferred that substantially all of the cocoa particles have a diameter of not more than about $30\mu$. It may be necessary to reduce the amount of shortening in the mix when chocolate is used because of the additional fat present as cocoa butter. It may also be necessary to add larger amounts of chocolate as compared to cocoa in order to provide an equivalent amount of flavoring and coloring.

In general, this invention comprises the steps of forming a mixture containing sugar, flour, and shortening, subjecting this mixture to simultaneous shearing and crushing forces, and thereafter adding cocoa to the mixture.

The initial step in practicing the process of this invention is a thorough pre-mixing of the sugar, flour, and shortening. Other ingredients of the mix except the cocoa can be added at this time. However, the keeping quality of the mix may be lessened if the leavening agents are added at this time, and it may be desirable to add them later. Materials which can be added either before or after the crushing and shearing step include egg solids, salt and milk powder. Except as hereinbefore stated, the order in which the ingredients are combined is not a critical factor in the performance of the mix. The amounts of the ingredients may vary widely as will hereinafter be set forth.

Various types of mixing means may be used for this pre-mixing step, such as ribbon blenders and conventional dough mixers, so long as they provide for adequate dispersion of fat and formation of a homogeneous mixture. It may be desirable to further break up any particles present in the mixture by passing it through an impacting device. One of such devices is disclosed in U. S. Patent No. 2,339,737 issued January 18, 1944. This device comprises two parallel horizontal discs spaced apart by interconnecting pins extending at right angles to the surfaces of the discs. An external shell encloses the device. Material to be broken up is passed through a hole in the center of the top disc while the discs are revolving at a high rate of speed. Centrifugal forces impact the feed material against the pins and the external shell. The broken-up material passes out through an outlet at the bottom of the device. Other devices suitable for this purpose and known in the art may be used.

When the material has been thoroughly mixed, it is then passed through some means which will simultaneously apply a shearing and crushing force to the mixture. The purpose of such means is to crush the sugar crystals and to bond a significant portion of these crushed crystals to the flour. It also tends to embed the sugar fragments in the flour. The shortening will be distributed throughout the mix, forming a thin film throughout the sugar and flour, and coating the sugar-flour particles.

Very good results may be obtained in the shearing and crushing step by the use of roller mills in which the adjacent rollers revolve at different speeds. For best results, the ratios of roll speeds of adjacent rolls need not exceed 5:1. The milling may be done by a single pass or by several passes. However, a large number of passes between rollers may prove economically unsound.

Optimum operating temperatures during the milling range from 70° to 110° F., and it may be desirable to cool or heat the rollers to maintain these temperatures.

A convenient measure of the milling conditions is by the work input to the mix. Although the optimum value will be set by the efficiency of the equipment, a total work input of 5-70 watt-hours/lb. will provide a satisfactory cake mix. Less work may be necessary if the sugar is initially added to the mix in the form of extremely small particles.

Cocoa is added to the mix subsequent to the shearing and crushing step. Any other ingredients not previously added should also be added at this time. These may be mixed in by means of ribbon blender, dough mixer, cut-flight conveyor, or other effective mixing devices. This mixing should be continued until all ingredients are completely mixed.

If any flakes remain from the shearing and crushing step, it may be desirable as a final step to subject the mix to means which will completely break up these flakes. Apparatus, such as the impacting device described hereinbefore, will accomplish this in a very satisfactory manner.

A preferred range of cake ingredients for chocolate cakes prepared by the process of this invention is as follows:

| Ingredient | | Amount |
|---|---|---|
| Sugar | percent | 38-48 |
| Flour | do | 28-45 |
| Shortening | do | 9-16 |
| Leavening agents | do | 1-4 |
| Salt | do | 0.5-1.5 |
| Cocoa | do | 5-7 |
| Egg solids | do | 0-5 |
| Non-fat dry milksolids | do | 0-5 |
| Flavoring | | Minor amounts |
| Coloring | | Minor amounts |

In general, the types and qualities of the ingredients are those which could be used in mixes of the prior art. For example, the shortening may include any conventional animal or vegetable shortening which may vary in plasticity from very firm to very soft. Emulsifiers of the commonly used type may also be present in the shortening in suitable amounts and proportions.

The practice of this invention will provide an especially good cake mix when the ratio of sugar to flour is greater than 1:1. The shortening used should contain suitable emulsifiers such as partially esterified polyhydric compounds having surface active properties. These include, but are not limited to, mono- and di-glycerides of fatty acids, fatty acid partial esters of sucrose, and phosphoric and sulfuric acid esters of polyhydroxy compounds. A number of suitable emulsifying agents may be found disclosed in U. S. Patent 2,024,357, Harris, issued December 17, 1935.

The flour normally should be bleached cake flour. A general purpose flour may be used if suitable emulsifiers are present in the shortening and if the egg and liquid content of the mix is properly adjusted.

Suitable sugars include any of the commonly used sugars, such as sucrose, dextrose, fructose, and levulose. Prior to the initial blending step, the sugar may be reduced to granulated or powder form.

Example I

As an example of this invention, two chocolate cake mixes were prepared, each having the following composition:

| | Percent |
|---|---|
| Sugar | 43.4 |
| Flour | 32.4 |
| Shortening | 13.0 |
| Non-fat milk solids | 2.5 |
| Cocoa | 6.2 |
| Soda | 1.3 |
| Monocalcium phosphate | 0.2 |
| Sodium acid pyrophosphate | 0.3 |
| Salt | 0.7 |

Each of the mixes was prepared by first creaming together sugar and shortening in a horizontal ribbon blender until a smooth homogeneous blend was formed. Flour, milk solids and salt were added. In one of the mixes, cocoa was added at the same time. The mixing was continued until a homogeneous mixture had been formed. This mixture was in the form of dry, relatively free-flowing particles. The mixture was then passed twice through a three-roll roller mill in which the ratios of the speeds of the rolls were 1:2:4. The cocoa was then added to the mix to which it had previously not been added. Each mixture was then blended for five minutes more in a horizontal ribbon blender and then put through the impacting device heretofore described.

Batters were prepared from each of the mixes by adding two-thirds cup of water to 20 oz. of mix and beating for two minutes using an electric household mixer at medium speed. Two eggs and one-third cup of water were then added and the batter was beaten for two additional minutes. The batters were poured into cake pans and baked at 350° F.

It was found that the crust was badly wrinkled, cracked and brittle on the cake made from the mix in which all of the ingredients had been milled. The cake made from the mix to which the cocoa had been added after milling had a normal and smooth crust.

Figure 1:
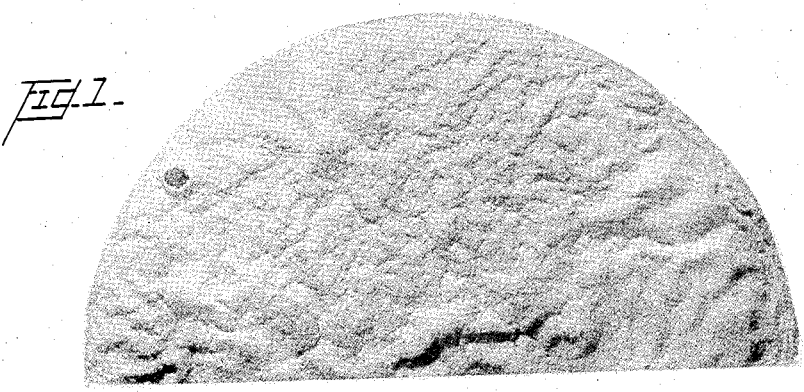
Figures 1 and 2 are illustrative of cakes made from mixes in which cocoa was milled with the other ingredients. These figures clearly show the wrinkling of the crust and separation of the crust from the cake.
Figure 2:
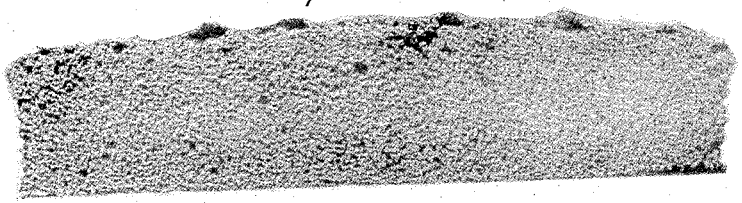
Figure 3:
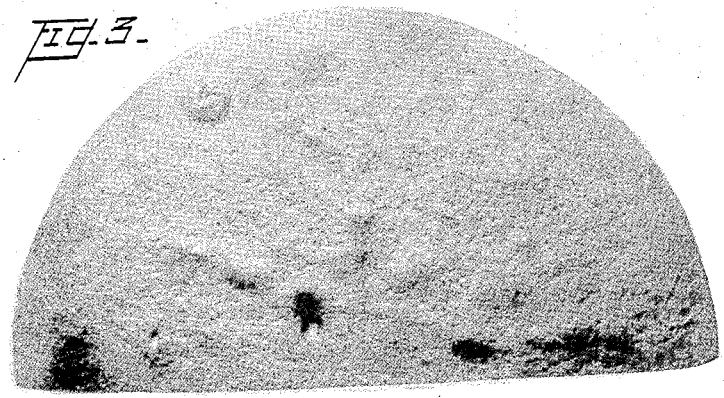
Figures 3 and 4 are illustrative of cakes prepared from mixes to which the cocoa was added after milling and demonstrates the unexpected improvement resulting from the practice of the process of the present invention.
Figure 4:
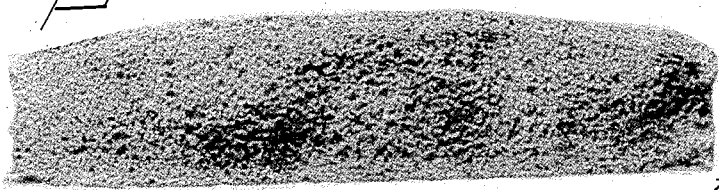

Under proper shearing and crushing conditions, a substantial part of the sugar crystals are fragmented. The cocoa is present in the mix in the form of discrete finely divided particles which are substantially unbonded to flour particles and substantially uncoated with shortening.

The bonding of the sugar and flour and the uniform density of the bonded sugar and flour can be clearly shown by sedimentation tests. The fat is extracted from the mix by hot hexane, and then equal amounts of the mix are added to benzene-carbon tetrachloride liquid mixtures having various densities. By measuring the amounts of fat-free mix which float and sink in the liquid mixtures of various densities, it has been found that not more than 10% of any fat-free mix of this invention will have a density greater than 1.59, and not more than about 32% will have a density less than 1.50. For convenience, densities measured in this manner will hereinafter be referred to as sedimentation densities. As a comparison, when sugar and flour mixtures, in which the sugar and flour are not bonded, are tested in the same manner, it will be found that the sugar and flour separate, and all sugar will have a density greater than 1.59, while substantially all of the flour will have a density less than 1.47.

What is claimed is:

1. The method of making a culinary mix which comprises the steps of forming a homogeneous mixture comprising sugar, flour and shortening, then subjecting said mixture to simultaneous shearing and crushing forces, and thereafter adding cocoa to said mixture, whereby a pulverulent and free-flowing mix is obtained in which a substantial portion of the crystals of said sugar are fragmented and mechanically bonded to particles of said flour, in which said shortening is dispersed substantially in a thin film throughout said mix and coating said bonded sugar and flour, and in which said cocoa is in the form of discrete particles substantially unbonded to said flour particles and substantially uncoated with shortening.

2. The method of making a culinary mix which comprises the steps of forming a homogeneous mixture comprising sugar, flour and shortening, then passing said mixture between two rollers moving at different speeds, said rollers being spaced so as to exert simultaneous shearing and crushing forces on said mixture, and thereafter adding cocoa to said mixture, whereby a pulverulent and free-flowing mix is obtained in which a substantial portion of the crystals of said sugar are fragmented and mechanically bonded to particles of said flour, in which said shortening is dispersed substantially in a thin film throughout said mix and coating said bonded sugar and flour, and in which said cocoa is in the form of discrete particles substantially unbonded to said flour particles and substantially uncoated with shortening.

3. The method of making a culinary mix which comprises the steps of forming a homogeneous mixture comprising from 38 to 48 parts of sugar, from 28 to 45 parts of flour, and from 9 to 16 parts of shortening, then subjecting said mixture to simultaneous shearing and crushing forces, and thereafter adding from 5 to 7 parts of cocoa, whereby a pulverulent and free-flowing mix is obtained in which a substantial portion of the crystals of said sugar are fragmented and mechanically bonded to particles of said flour, in which said shortening is dispersed substantially in a thin film throughout said mix and coating said bonded sugar and flour, and in which said cocoa is in the form of discrete particles substantially unbonded to said flour particles and substantially uncoated with shortening.

4. The method of making a culinary mix which comprises the steps of forming a homogeneous mixture comprising from 38 to 48 parts of sugar, from 28 to 45 parts of flour, and from 9 to 16 parts of shortening, then passing said mixture between two rollers moving at different speeds, said rollers being spaced so as to exert simultaneous shearing and crushing forces on said mixture, and thereafter adding from 5 to 7 parts of cocoa, whereby a pulverulent and free-flowing mix is obtained in which a substantial portion of the crystals of said sugar are fragmented and mechanically bonded to particles of said flour, in which said shortening is dispersed substantially in a thin film throughout said mix and coating said bonded sugar and flour, and in which said cocoa is in the form of discrete particles substantially unbonded to said flour particles and substantially uncoated with shortening.

5. A culinary mix suitable for the preparation of baked goods, said mix comprising crystalline sugar, flour, and shortening, a substantial portion of the crystals of said sugar being fragmented and mechanically bonded to particles of said flour, said shortening being substantially dispersed in a thin film throughout said mix and coating said bonded sugar and flour, and said mix containing additionally discrete particles of cocoa substantially unbonded to flour particles and substantially uncoated with shortening.

6. A culinary mix suitable for the preparation of baked goods, said mix comprising crystalline sugar, flour, shortening, and cocoa, a substantial portion of the crystals of said sugar being fragmented and mechanically bonded to particles of said flour, said shortening being substantially dispersed in a thin film throughout said mix and coating said bonded sugar and flour, and said cocoa being present in said mix in the form of finely divided particles, substantially all of said particles of cocoa having a diameter of less than about $30\mu$ and being substantially unbonded to flour particles and substantially uncoated with shortening.

7. A culinary mix comprising crystalline sugar, flour, shortening, and cocoa, a substantial portion of the crystals of said sugar being fragmented and mechanically bonded to particles of said flour, said shortening being substantially dispersed throughout and coating said bonded sugar and flour, and said cocoa being present in said mix in the form of finely divided particles, substantially all of said particles of cocoa having a diameter of less than about $30\mu$ and being substantially unbonded to flour particles and substantially uncoated with shortening, not more than 10% of said mix having a sedimentation density greater than 1.59 and not more than 32% of said mix having a sedimentation density less than 1.50.

8. A culinary mix according to claim 7, comprising from 38 to 48 parts of sugar, from 28 to 45 parts of flour, from 9 to 16 parts of shortening, and from 5 to 7 parts of cocoa.

References Cited in the file of this patent

UNITED STATES PATENTS

| | | |
|---|---|---|
| 827,936 | Obermaier | Aug. 7, 1906 |
| 1,700,510 | Oches | Jan. 29, 1929 |
| 2,172,211 | Lloyd | Sept. 5, 1939 |
| 2,555,902 | Salo et al. | June 5, 1951 |

OTHER REFERENCES

"Experimental Cookery," 1937 by B. Lowe, published by John Wiley & Sons, Inc. (N. Y.), pp. 514 and 515.